| United States Patent [19] | [11] | 4,280,458 |
| Kiovsky | [45] | Jul. 28, 1981 |

[54] ANTIKNOCK COMPONENT

[75] Inventor: Thomas E. Kiovsky, Houston, Tex.

[73] Assignee: Shell Oil Company, Houston, Tex.

[21] Appl. No.: 183,539

[22] Filed: Sep. 2, 1980

[51] Int. Cl.$^3$ ............................................. F02B 47/00
[52] U.S. Cl. ................................... 123/198 A; 44/64; 44/68; 44/69; 252/386
[58] Field of Search .............. 44/64, 68, 69; 252/386; 123/1 A, 198 A

[56] References Cited

U.S. PATENT DOCUMENTS

| 3,859,261 | 1/1975 | Breslow | 260/349 |
| 3,968,129 | 7/1976 | Kampe et al. | 260/349 |
| 3,991,131 | 11/1976 | Porter et al. | 260/349 |

OTHER PUBLICATIONS

Hartle et al., A New Class of Non–Metallic Antiknock, ACS Symposium on the Chemistry for Octane Improvement, Mar. 23-28, 1980, pp. 73-78.

*Primary Examiner*—Winston A. Douglas
*Assistant Examiner*—Y. Harris-Smith
*Attorney, Agent, or Firm*—Dean F. Vance

[57] ABSTRACT

Incorporation of small amounts of ortho-azidophenol in gasoline stocks results in improved antiknock performance. Improvements in octane quality of about 0.29 RON per gram per gallon of gasoline are found.

15 Claims, No Drawings

ANTIKNOCK COMPONENT

BACKGROUND OF THE INVENTION

For a long time, lead (and later manganese) compounds have been employed as octane-improving compounds in gasoline. For example, U.S. Pat. No. 1,592,953 disclosed the use of tetraethyl lead as an antiknock (octane improving) additive for gasoline in the early 1920's. Other antiknock compounds are also known.

Recently, the Environmental Protection Agency has banned use of lead- and manganese-based antiknock compounds in certain types of gasoline. However, since higher compression engines (which require higher octane fuel) are more efficient, the need for higher octane gasoline remains. One way of increasing octane quality without lead or manganese compound is through the use of ashless antiknock compounds. For example, the antiknock activity and aniline and some of its derivatives has been known for nearly sixty years. Recently, Hartle and Singerman disclosed use of novel aniline-based antiknocks—orthoazidoanilines—at the March 1980 American Chemistry Society Symposium on Chemistry for Octane Improvement. However, use of these aniline compounds also resulted in a significant increase in $NO_x$ emissions.

A new ashless antiknock compound has now been found that not only improves octane and antiknock properties, but also should not adversely effect $NO_x$ emissions as much as some other antiknock compounds.

SUMMARY OF THE INVENTION

The present invention covers both a motor fuel composition and a method for operating a spark ignition internal combustion engine. The motor fuel composition contemplated herein comprises a mixture of hydrocarbons in the gasoline boiling range containing an octane-improving amount of ortho-azidophenol or alkyl derivatives of ortho-azidophenol. The ortho-azidophenol additive can be employed alone or with lead, manganese or lead and manganese components. In a preferred embodiment, the orthoazidophenol is employed in the absence of added lead or manganese compounds. As shown in the illustrative embodiments, the addition of ortho-azidophenol to a typical "lead-free" gasoline at 4 g/gal results in an increase in Research Octane Number (RON) of 0.29 per gram ortho-azidophenol per gallon gasoline. Interestingly, addition of para-azidophenol at the same rate results in a decrease in octane of 0.51 RON/g/gal. While ortho-azidoaniline produces an increase in RON similar to that of orthoazidophenol, it is expected that ortho-azidoaniline also has a greater tendency to increase $NO_x$ emissions that does ortho-azidophenol. Further, other ortho-azido compounds, such as o-azidoanisole, o-azidobromobenzene o-azidobenzoic acid and o-azidothiophenol have been shown to be either neutral or pro-knock compounds.

DETAILED DESCRIPTION OF THE INVENTION

An essential component of the present invention is an antiknock material selected from the group consisting of ortho-azidophenol and alkyl derivatives of ortho-azidophenol. Preferably, the alkyl derivatives are $C_1$ to $C_6$ alkyl derivatives. Examples of such alkyl derivatives include 2-azido-5-methyl phenol, 2-azido-4-methyl phenol and 2-azido-4-ethyl phenol. In a preferred embodiment the antiknock material is ortho-azidophenol. The remainder of the specification refers only to ortho-azidophenol. However, the scope of the invention is not so limited and includes the alkyl derivatives of ortho-azidophenol.

As shown in Illustrative Embodiment I, ortho-azidophenol can be easily prepared starting with commercially available ortho-aminophenol. However, the method of preparing ortho-azidophenol is not critical and does not limit the scope of the present invention. The ortho-azidophenol additives are employed in a mixture with hydrocarbons of the gasoline boiling range. The amount of ortho-azidophenol employed is about 0.02 to about 0.7 percent by weight of the resulting motor fuel composition, preferably about 0.1 to about 0.4 percent by weight.

Suitable liquid hydrocarbon fuels of the gasoline boiling range are mixtures of hydrocarbons having a boiling range of from about 25° C. (77° F.) to about 232° C. (450° F.), and comprise mixtures of saturated hydrocarbons, olefinic hydrocarbons and aromatic hydrocarbons. Preferred are gasoline blends having a saturated hydrocarbon content ranging from about 40 to about 80 percent volume, an olefinic hydrocarbon content from about 0 to about 30 percent volume and an aromatic hydrocarbon content ranging from about 10 to about 60 percent volume. The base fuel can be derived from straight run gasoline, polymer gasoline, natural gasoline, from thermally or catalytically cracked or thermally cracked petroleum stocks and mixtures of these. The hydrocarbon composition and octane level of the base fuel are not critical. Any conventional motor fuel base may be employed in the practice of this invention.

Normally, the hydrocarbon fuel mixtures to which the invention is applied are substantially lead-free, but may contain minor amounts of blending agents such as methanol, ethanol, isopropanol, methyl-tertbutylether and the like. The fuels may also contain antioxidants such as phenolics, e.g. 2,6-di-tert-butylphenol or phenylenediamines, e.g. N,N'-di-sec-butyl-p-phenylenediamine, dyes, metal deactivators, dehazers such as polyester-type ethoxylated alkylphenol-formaldehyde resins and the like.

The antiknock agent of the present invention can be introduced into the combustion zone of the engine in a variety of ways. Thus the agent can be injected into the intake manifold intermittently or substantially continuously, as described, preferably in a hydrocarbon carrier having a final boiling point (by ASTM D86) about 232° C. (450° F.). A preferred method is to add the agent to the fuel or blended with other fuel additives.

The invention further provides a concentrate for use in liquid hydrocarbon fuel in the gasoline boiling range.

In an alternative embodiment, the ortho-azidophenol is employed as a co-antiknock with certain tetraethyl lead or manganese compounds, see Illustrative Embodiment 3.

In one preferred embodiment, tetraethyllead is the sole tetraalkyllead component present therein. However, the invention is also applicable to various mixtures of methyl and ethyl lead alkyls, especially those which consist essentially of tetraethyllead, triethylmethyllead, and one or more of the compounds, diethyldimethyllead, ethyltrimethyllead, and tetramethyllead. Many such mixtures may be produced, for example, by the chemical redistribution between tetraethyllead and tetramethyllead.

The amount of lead employed according to an alternative embodiment of the invention will be in the range from about 0.01 to about 5 grams of lead per gallon of gasoline, preferably about 0.05 to about 2.5 grams of lead per gallon.

In another alternative embodiment, the oil soluble cyclopentadienyl manganese compounds useful in the method and compositions of this invention have the general formula: Mn A (B)$_3$ wherein A represents a cycloaromatic radical containing from 5 to 13 carbon atoms and B is a carbonyl group.

The constituent designated by the symbol A in the formula comprises a cycloaromatic radical, that is, a cyclopentadiene-type hydrocarbon radical which is a radical containing the cyclopentadienyl moiety. Generally such cycloaromatic hydrocarbon groups can be represented by the formulae

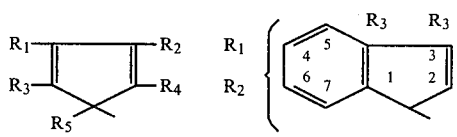

where the R's are selected from the group consisting of hydrogen and univalent organic hydrocarbon radicals.

A preferred class of cycloaromatic radicals suitable in the practice of this invention are those which contain from 5 to 13 carbon atoms. Exemplary radicals are cyclopentadienyl, indenyl, methylcyclopentadienyl, propylcyclopentadienyl, diethylcyclopentadienyl, phenylcyclopentadienyl, tert-butylcyclopentadienyl, p-ethylphenylcyclopentadienyl, 4-tert-butyl indenyl and the like. The compounds from which these are derived are preferred as they are more readily available cycloaromatic compounds and the metallic cycloaromatic coordination compounds obtainable from them have the more desirable characteristics of volatility and solubility which are prerequisites of superior hydrocarbon additives.

Representative compounds include cyclopentadienyl manganese tricarbonyl, methylcyclopentadienyl manganese tricarbonyl, ethylcyclopentadienyl manganese tricarbonyl, propylcyclopentadienyl manganese tricarbonyl, indenyl manganese tricarbonyl, methyl indenyl manganese tricarbonyl, flourenyl manganese tricarbonyl, dimethylcyclopentadienyl manganese tricarbonyl, methylpropylcyclopentadienyl manganese tricarbonyl, phenylcyclopentadienyl manganes tricarbonyl and the like.

The amount of cyclopentadienyl manganese compound employed according to the invention will be in the range from about 0.01 to about 5 grams of manganese per gallon as a cyclopentadienyl manganese tricarbonyl and a most preferred range is from about 0.01 to about 0.9 grams of manganese per gallon as methylcyclopentadienyl manganese tricarbonyl (MMT).

The invention is further illustrated by reference to the following Illustrative Embodiments and Comparative Example, which are given for the purpose of illustration only and are not meant to limit the invention to the particular reactants and conditions employed therein.

ILLUSTRATIVE EMBODIMENT I

The ortho-azidophenol component was prepared from commercially available ortho-aminophenol. Initially, 10.9 grams (0.1 moles) of o-aminophenol was dissolved in a mixture of 25 milliliters (ml) concentrated HCl and 40 ml water. The mixture was cooled to 0° C. by adding ice, and then 7.25 grams NaNO$_2$ was added as an aqueous solution.

After adding all the NaNO$_2$ solution, the mixture was stirred for one hour at 0°–5° C. The resulting reaction mixture was then transferred to a 1000 ml beaker where 6.5 grams NaN$_3$ in about 50 ml water was added dropwise with stirring. During addition of the NaN$_3$ the temperature was maintained at about 5° C. After adding all of the NaN$_3$ solution, the mixture was allowed to warm to room temperature. The o-azidophenol product then separated as a brown oil. This oil was extracted with ether. The ether layer was washed with water, dried and all the ether evaporated on a rotary evaporater. About 9.5 grams were recovered (70% yield) as a brownish oil. This oil was analyzed by infrared, and nuclear magnetic resonance spectroscopy and by liquid chromatography and found to have the postulated structure and to be essentially pure.

ILLUSTRATIVE EMBODIMENT II

The o-azidophenol product from Illustrative Embodiment I was added to a typical unleaded gasoline having a 91.2 RON. The RON of the resulting solutions was measured by the standard ASTM research octane number technique, and the results are presented below in Table 1:

TABLE 1

| Concentration, grams per gallon | RON | ΔRON |
|---|---|---|
| 0; (control) | 91.2 | — |
| 5.0; (0.17% weight) | 92.6 | +1.4 |
| 15.1; (0.52% weight) | 94.6 | +3.4 |

ILLUSTRATIVE EMBODIMENT III

The o-azidophenol product from Illustrative Embodiment I was added to a typical leaded gasoline containing 2.4 g Pb/gal as lead alkyls. The RON of the resulting solutions was measured by the standard ASTM research octane number technique, and the results are presented in Table 2:

TABLE 2

| Concentration of o-azidophenol, grams per gallon | RON | ΔRON |
|---|---|---|
| 0 (control) | 92.9 | — |
| 5.7 (0.20 %w) | 93.3 | +0.4 |
| 11.4 (0.40 %w) | 94.0 | +1.1 |

COMPARATIVE EXAMPLE I

In Comparative Example I various other azido-containing compounds were employed in similar solutions of unleaded gasoline. The results are presented below in Table 3. As shown in the Table, only o-azidophenol and o-azidoaniline proved to have antiknock qualities, the others being neutral or proknock (negative sign).

TABLE 3

| Azido Group-Containing Ashless Antiknocks Candidates | | |
|---|---|---|
| | Conc, g/gal | ΔRON/g/gal |
| o-azidoaniline | 4 | +0.29 |
| p-azidoaniline | 4 | −0.10 |
| o-azidophenol | 4 | +0.29 |
| p-azidophenol | 4 | −0.51 |
| o-azidoanisole | 9 | −0.10 |

TABLE 3-continued

| Azido Group-Containing Ashless Antiknocks Candidates | | |
|---|---|---|
| | Conc, g/gal | ΔRON/g/gal |
| o-azidobromobenzene | 9 | −0.40 |
| o-azidobenzoic acid | 2 | 0.0 |
| trans-2-azidocyclohexanol | 8 | 0.0 |
| o-azidothiophenol | 4 | 0.0 |

What is claimed is:

1. A motor fuel composition comprising a mixture of hydrocarbons in the gasoline boiling range containing an octane-improving amount of an antiknock material selected from the group consisting of ortho-azidophenol and alkyl derivatives of ortho-azidophenol.

2. The composition of claim 1 wherein the antiknock material is a $C_1$ to $C_6$ alkyl derivative of ortho-azidophenol.

3. The composition of claim 2 wherein the antiknock material is selected from the group consisting of 2-azido-5-methyl phenol, 2-azido-4-methyl phenol and 2-azido-4-ethyl phenol.

4. The composition of claim 1 wherein the antiknock material is ortho-azidophenol.

5. The composition according to claim 1 or claim 4 wherein the amount of said antiknock material is between about 0.02 and about 0.70 percent by weight of said motor fuel composition.

6. The composition according to claim 1 also containing a tetraalkyl lead component.

7. The composition according to claim 6 wherein said tetraalkyl lead component is tetraethyl lead.

8. The composition according to claim 6 or 7 wherein the amount of tetraalkyl lead or tetraethyl lead component is between about 0.01 and about 5 grams lead per gallon of said hydrocarbons.

9. The composition according to claim 1 also containing a cycloaromatic manganese compound wherein the cycloaromatic group contains from 5 to 13 carbon atoms.

10. The composition according to claim 9 wherein said cycloaromatic manganese compound is methyl cyclopentadienyl manganese tricarbonyl.

11. The composition according to claim 9 wherein the amount of cycloaromatic manganese compound component is between about 0.01 and about 5 grams of manganese per gallon of said hydrocarbons.

12. A method for operating a spark ignition internal combustion engine which comprises introducing with the combustion intake charge to said engine on octane-improving amount of an antiknock material selected from the group consisting of ortho-azidophenol and alkyl derivatives of ortho-azidophenol.

13. The method according to claim 12 wherein said antiknock material is introduced with the combustion intake charge in a hydrocarbon carrier.

14. The method according to claim 13 wherein the hydrocarbon carrier is gasoline.

15. The method according to claim 14 wherein the amount of said antiknock material is between about 0.02 and about 0.7 percent by weight of the combined gasoline and antiknock material mixture.

* * * * *